(12) United States Patent
Parupati et al.

(10) Patent No.: US 10,783,388 B2
(45) Date of Patent: Sep. 22, 2020

(54) SPOOF DETECTION USING MULTIPLE IMAGE ACQUISITION DEVICES

(71) Applicant: Alibaba Group Holding Limited, George Town (KY)

(72) Inventors: Srikanth Parupati, Framingham, MA (US); Yash Joshi, Kansas City, MO (US); Reza R. Derakhshani, Shawnee, KS (US)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 110 days.

(21) Appl. No.: 16/172,601

(22) Filed: Oct. 26, 2018

(65) Prior Publication Data

US 2020/0134342 A1    Apr. 30, 2020

(51) Int. Cl.
*G06K 9/00* (2006.01)
*H04N 5/33* (2006.01)
*G06F 21/32* (2013.01)

(52) U.S. Cl.
CPC ......... *G06K 9/00899* (2013.01); *G06F 21/32* (2013.01); *G06K 9/00228* (2013.01); *G06K 9/00684* (2013.01); *H04N 5/33* (2013.01)

(58) Field of Classification Search
CPC ........... G06K 9/00899; G06K 9/00228; G06K 9/00684; H04N 5/33; G06F 21/32
See application file for complete search history.

(56) References Cited

U.S. PATENT DOCUMENTS

| | | | |
|---|---|---|---|
| 9,390,327 B2 * | 7/2016 | Gottemukkula | ... G06K 9/00604 |
| 2004/0041997 A1 | 3/2004 | Uomori et al. | |
| 2016/0267339 A1 * | 9/2016 | Nakano | ............ G06K 9/00228 |
| 2016/0371555 A1 * | 12/2016 | Derakhshani | ........... G01S 15/89 |
| 2017/0286788 A1 * | 10/2017 | Fan | .................... G06K 9/00288 |
| 2017/0325721 A1 | 11/2017 | Matsuda et al. | |
| 2018/0165512 A1 * | 6/2018 | Fan | ...................... G06K 9/2027 |
| 2018/0247142 A1 | 8/2018 | Oda et al. | |

(Continued)

OTHER PUBLICATIONS

PCT International Search Report and Written Opinion in International Application No. PCT/US2019/058125, dated Feb. 5, 2020, 11 pages.

(Continued)

*Primary Examiner* — Neil R McLean
(74) *Attorney, Agent, or Firm* — Fish & Richardson P.C.

(57) ABSTRACT

The technology described in this document can be embodied in a method that includes receiving from a sensor, information indicative of an environmental condition. The method also includes receiving first information indicative of whether or not a first image captured by a first image acquisition device corresponds to an alternative representation of a live person, and receiving second information indicative of whether or not a second image captured by a second image acquisition device corresponds to the alternative representation. The first information and the second information are combined in a weighted combination, the corresponding weights being assigned in accordance with the environmental condition. A determination is made, based on the weighted combination, that a subject in the first and second images is an alternative representation of a live person, and in response, access to the secure system is prevented.

20 Claims, 6 Drawing Sheets

(56) References Cited

U.S. PATENT DOCUMENTS

2019/0025672 A1    1/2019   Van Der Sijde et al.
2020/0134344 A1    4/2020   Joshi et al.

OTHER PUBLICATIONS

Zanuttigh et al., "Operating Principles of Structured Light Depth Cameras," Time-of-Flight and Structured Light Depth Cameras, Springer International Publishing, 2016, Chapter 2, DOI: 10.1007/978-3-319-30973-6_2, pp. 43-79.
U.S. Appl. No. 16/171,029, filed Oct. 25, 2018, Joshi et al.
Sun et al., "TIR/VIS correlation for liveness detection in face recognition," 14th International Conference on Computer Analysis of Images and Patterns, Aug. 2011, 6855:114-121.

\* cited by examiner

SPOOF DETECTION USING MULTIPLE IMAGE ACQUISITION DEVICES

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method for preventing access to a secure system based on determining one or more captured images to be of an alternative representation of a live person. The method includes receiving from a sensor, information indicative of an environmental condition. The method also includes receiving, at one or more processing devices, first information indicative of whether or not a first image captured by a first image acquisition device corresponds to the alternative representation of a live person, and receiving, at the one or more processing devices, second information indicative of whether or not a second image captured by a second image acquisition device corresponds to the alternative representation of a live person. The method further includes combining the first information and the second information in a weighted combination, wherein the corresponding weights are assigned in accordance with the environmental condition, and determining, based on the weighted combination, a subject in the first and second images to be an alternative representation of a live person. The method also includes preventing access to the secure system responsive to determining the subject to be an alternative representation of a live person.

In another aspect, this document features a system that includes an image analysis engine having one or more processing devices. The image analysis engine is configured to receive from a sensor, information indicative of an environmental condition. The image analysis engine is also configured to receive first information indicative of whether or not a first image captured by a first image acquisition device corresponds to the alternative representation of a live person, and receive second information indicative of whether or not a second image captured by a second image acquisition device corresponds to the alternative representation of a live person. The image analysis engine is further configured to combine the first information and the second information in a weighted combination, wherein the corresponding weights are assigned in accordance with the environmental condition, and determine, based on the weighted combination, a subject in the first and second images to be an alternative representation of a live person. In response, the image analysis engine is configured to prevent access to the secure system.

In another aspect, this document features one or more machine-readable storage devices comprising machine-readable instructions configured to cause one or more processing devices perform various operations. The operations include receiving from a sensor, information indicative of an environmental condition. The operations also include receiving, at one or more processing devices, first information indicative of whether or not a first image captured by a first image acquisition device corresponds to the alternative representation of a live person, and receiving, at the one or more processing devices, second information indicative of whether or not a second image captured by a second image acquisition device corresponds to the alternative representation of a live person. The operations further include combining the first information and the second information in a weighted combination, wherein the corresponding weights are assigned in accordance with the environmental condition, and determining, based on the weighted combination, a subject in the first and second images to be an alternative representation of a live person. The operations also include preventing access to the secure system responsive to determining the subject to be an alternative representation of a live person.

Implementations of the above aspects can include one or more of the following features.

The alternative representation of a live person can include a photograph of the live person. The photograph can be printed on paper, or presented on a display device. The first image acquisition device can include an infrared (IR) camera, and the first image can be captured by the IR camera under structured light illumination. The second image acquisition device can include a polarization detector configured to detect a polarization state of light received from the subject. In some implementations, third information can be received, wherein the third information is indicative of whether or not a third image captured by a third image acquisition device corresponds to the alternative representation of a live person. The third information can be included in the weighted combination, wherein the weight associated with the third information is determined in accordance with the environmental condition. The third image acquisition device can include a thermal camera. The environmental condition can indicate that a corresponding location is one of an indoor location or an outdoor location. The information indicative of the environmental condition can indicate an amount of sunlight at a corresponding location. The secure system can include a user-interface disposed in a kiosk. The sensor can be disposed in the kiosk.

Various implementations described herein may provide one or more of the following advantages. Reliability and/or security of a biometric authentication system can be improved by allowing the system to discriminate between live persons and alternative representations such as photographs displayed on paper or display devices. By allowing the determination to be made based on a weighted combination of information received from multiple image acquisition devices, the technology described herein can improve performance of the underlying biometric authentication system under different environmental conditions. For example, by adaptively selecting the weights associated with the information received from multiple image acquisition devices based on one or more sensors sensing environmental conditions, the biometric authentication system can be made more robust with respect to various environmental conditions that may adversely affect the performance of one or more of the multiple image acquisition devices.

Repeat use of reference characters in the present specification and drawings is intended to represent same or analogous features or elements.

DETAILED DESCRIPTION

This document presents an image analysis method in which images captured using multiple image acquisition devices of a biometric authentication system are analyzed to determine if the images corresponds to an actual live person, or to an alternative representation (e.g., a photograph or other image of the live person printed on paper, or displayed on a high definition display device, also referred to herein as spoofs) of the live person. The individual determinations based on each of the multiple image acquisition devices are then combined in a weighted combination to make a final determination. The corresponding weights are determined based on environmental conditions determined, for example, based on input from one or more sensors. For example, for a given environmental condition, a low weight can be assigned to a determination using an image acquisition device that is known to perform unsatisfactorily under the particular environmental condition. Conversely, a relatively high weight can be assigned to a determination using another image acquisition device known to perform well under the particular condition. For example, a determination made using an image acquisition device employing infrared (IR) or near-IR illumination is highly reliable in indoor conditions, whereas it can be less reliable in the presence of direct sunlight. On the other hand, a determination made using an image acquisition device that relies on detecting a polarization state of received light can be reliable even in the presence of direct sunlight. Accordingly, in an environmental condition where direct sunlight is present, the determination made using the polarization state detection can be assigned a higher weight as compared to the determination made using IR/near-IR illumination. Making the final determination using such weighted combinations allow for the underlying spoof detection system to be more robust across various environmental conditions, which in turn may improve the overall reliability of the system.

A robust spoof-detection system can have several advantages. If the captured image is not determined to correspond to a live person, any further processing of the captured image by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes preprocessing steps that allow for determining whether the captured image corresponds to an actual live person or a spoof alternative representation such as a printed or displayed image/photograph of the live person. Upon detecting that the captured image is a spoof, any further processing of the image to allow access to the corresponding secure system can be prevented, thereby adding an added layer of security to the system.

Figure 1:
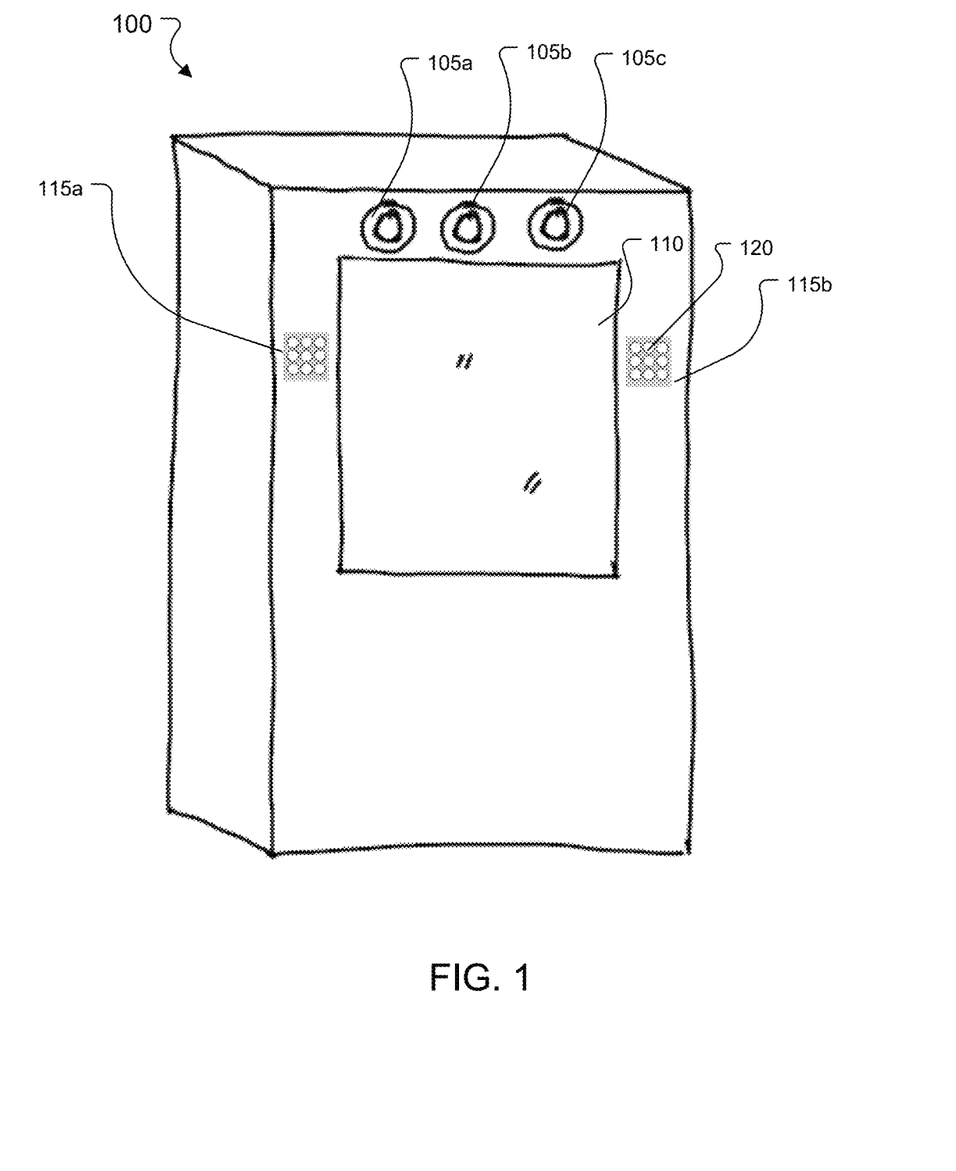
FIG. 1 shows a kiosk machine as an example environment in which the technology described herein may be used.

FIG. 1 shows a kiosk machine 100 as an example environment in which the technology described herein may be used. Such kiosk machines may be used for various purposes that require authenticating users via one or more biometric authentication processes. For example, the kiosk 100 can include an automated teller machine (ATM) that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include one or more image acquisition devices 105a, 105b, and 105c (105 in general) that captures images of users interacting with the kiosk 100. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the one or more image acquisition devices 105 for authentication. The images captured using the one or more image acquisition devices 105 may then be used to authenticate/identify/verify a pre-stored profile for the user, and the payment for the food may then be automatically deducted from an account linked to the profile.

The image acquisition device 105 can be of various types. In some implementations, one of the image acquisition devices 105 can be a depth sensing camera that captures images of subjects illuminated by IR or near IR wavelengths. In some implementations, one of the image acquisition devices 105 can include a camera/sensor configured to capture an image of a subject illuminated by long-wave infrared (LWIR). An LWIR image acquisition device may also be referred to as a thermal imaging camera. Such a camera can include long wave heat sensors that collect, for example, information in wavelengths between 8 μm to 14 μm, or at lower wavelengths such as between 3 μm to 5 μm. In some implementations, one of the image acquisition devices 105 can include a polarizer that is configured to receive light in particular polarization states.

In some implementations, the images captured using the image acquisition devices 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the images captured using the image acquisition devices 105 are used to authenticate/identify/verify a user, and provide access to accounts/privileges associated with the identity of the user. For example, one or more images captured by the image acquisition devices 105 can be analyzed to recognize a user (e.g., using face recognition, eye-print recognition, iris recognition etc.) using a corresponding underlying biometric authentication process. However, malicious attempts to breach the security of such biometric authentication processes often involve presentation of an alternative representation of a live person (e.g., photograph or other image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems, thereby improving reliability/security of the systems.

In some implementations, the kiosk 100 can include one or more illumination sources 115a and 115b (115, in general) configured to generate electromagnetic radiation for illuminating the subject of the images being captured by the image acquisition devices 105. In some implementations, the kiosk 100 can include a separate illumination source 115 for one or more of the multiple image acquisition devices 105. For example, if one of the image acquisition devices 105 is an IR camera, a corresponding illumination source 115 can include one or more IR sources. Similarly, if one of the image acquisition devices 105 includes a polarization state detector, a corresponding illumination source 115 can include one or more sources configured to emit light of a particular linear or circular polarization state. In some implementations, illumination sources 115 can each include a light source array that includes one or more light sources 120 (e.g., light emitting diodes (LEDs)) arranged in a particular pattern. In the example of FIG. 1, each illumination source 115 includes a light source array of nine LEDs arranged in three rows of three LEDs each. However, the light sources or LEDs may be arranged in various other patterns including, for example, patterns of concentric circles. While FIG. 1 shows two spatially separated light sources 115a and 115b, a single light source 115 may also be used.

Figure 2A:
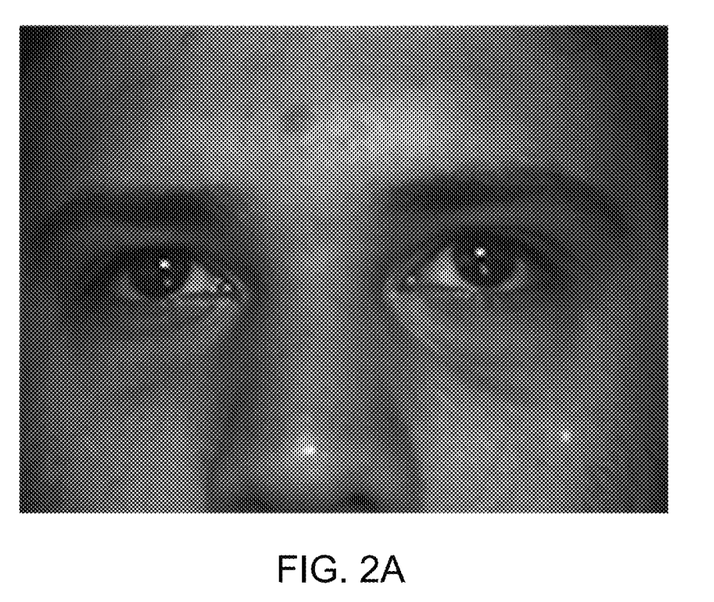
FIG. 2A shows an example of an image of a live person captured under structured light illumination.
Figure 2B:
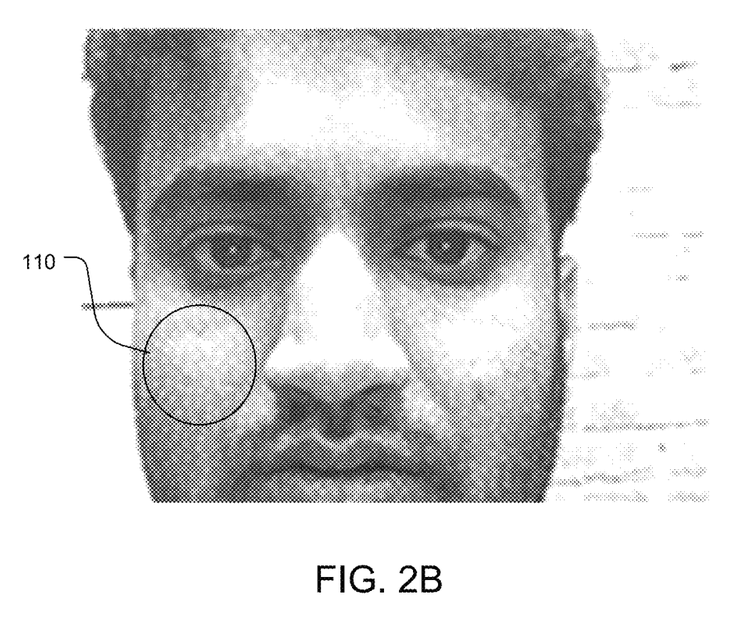
FIG. 2B shows an example of an image of an alternative representation of a live person—a photograph printed on paper—captured under structured light illumination

In some implementations, an illumination source 115 can be configured to illuminate the subject with a corresponding pattern of illumination. The pattern of illumination can be referred to as structured light, and configured to introduce high frequency components into images that do not correspond to that of a live person. The skin of a live person scatters and absorbs light incident on it. Therefore, even when structured light, such as that radiated by a pattern of LEDs, is incident on human skin, the light is scattered internally and reflected as diffused light such that a representation of the pattern is not easily detected in an image of the live person captured by an image acquisition device 105. On the other hand, if the image acquisition device 105 captures an image of an alternative representation of the live person (e.g., a photograph of the person printed on paper), a representation of the pattern may be detectable in the image, for example, due to specular reflection and/or lack of scattering and diffusion. This is illustrated in FIGS. 2A and 2B, which show an example of an image of a live person and an example of an image of a photograph printed on paper, respectively. As seen in FIG. 2B (for example, within the circular area 210), the image of the photograph printed on paper includes a representation of the pattern of the structured light source in the form of high-frequency dots. However, as illustrated by FIG. 2A, an image of a live person does not include any such representation of the pattern. These differences can be leveraged to discriminate between images of live persons and images of alternative representations of live persons using the technology described herein.

In some implementations, an illumination source 115 can be configured to emit light with a particular polarization state. When such light is reflected back from a target/subject, the polarization state of the reflected light can be different depending on the nature of the target. For example, when a light hits paper surface, the light gets reflected in all direction. On the other hand, in case of live human face, specular light reflection (horizontal polarized waves) from cheeks, forehead and nose areas and diffusion reflection (vertical polarized waves) from sides of face are expected. In some implementations, if an illumination source 115 can be configured to emit polarized light to improve the specular and diffusion reflection from a live human target. If such polarized light is reflected off paper, the polarization state of the reflected light remains the same across the entire target. This difference, which can be detected, for example, using an electronic linear polarizer in front of a camera, can therefore be utilized in determining whether the subject in the captured image is a live person, or a spoof alternative representation of a live person.

In some implementations, the illumination sources 115 can be configured to radiate electromagnetic radiation in the infrared (IR) wavelength range. In some implementations, an illumination source includes an infrared projector disposed inside a depth sensing camera, wherein the projector projects a dotted pattern of illumination on the target. In some implementations, the wavelength ranges radiated by the illumination sources 115 can include the NIR spectrum of about 700-1400 nm. While the example in FIG. 1 shows two illumination sources 115 that are physically separated along a horizontal direction, more or fewer illumination sources 115 may also be used. In some implementations, the illumination wavelength can be selected, for example, such that a scattering of light of the selected wavelength is significantly more for human skin than that for paper, display or another surface that may be used for presenting a spoof alternative representation. Operating principles of obtaining images using structured light depth cameras are well known, and discussed, for example, in Chapter 2 of the book: "Time-of-Flight and Structured Light Depth Cameras—Technology and Applications," Zanuttigh et. al., ISBN: 978-3-319-30971-2, the content of which is incorporated herein by reference.

In some implementations, the illumination source 115 can be configured to emit a narrow range of wavelengths such as 840-950 nm. The scattering of light in this IR wavelength range is significantly more for human skin than that for paper, display or another surface that may be used for presenting a spoof alternative representation. When near-infrared light is illuminated on human skin and paper, the light gets reflected as subsurface reflection due to scattering/diffusion in dermis and epidermis layers of skin. In case of paper attacks, light gets reflected due to specular reflection, and the absorption of light is significantly less compared to live skin.

Figure 3A:
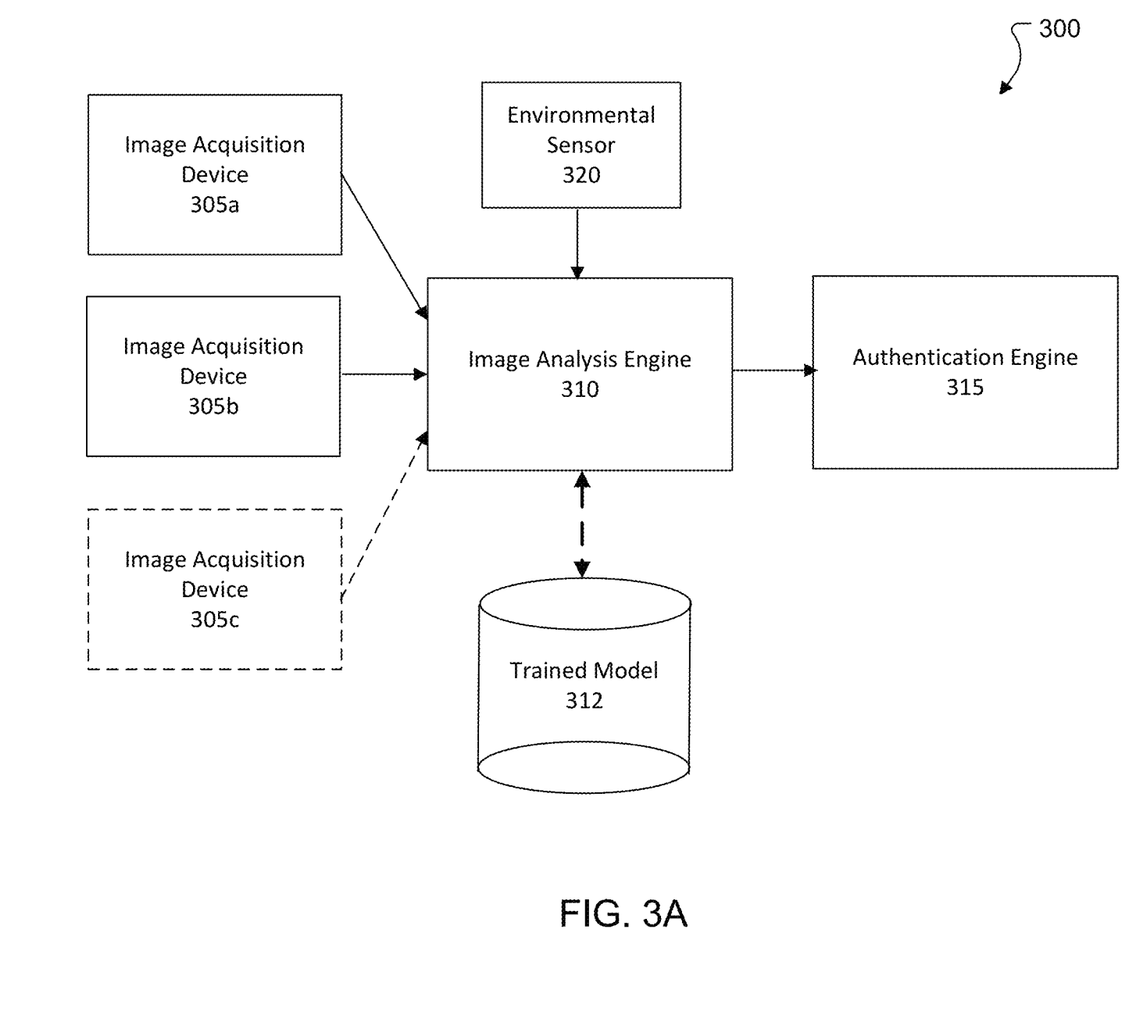
FIG. 3A is a block diagram of an example system usable for implementing the technology described herein.

FIG. 3 shows an example system 300 for analyzing images captured under structured light illumination to determine if the images are of live persons or spoof alternatives of live persons. The system 300 includes at least two image acquisition devices 305a and 305b (305 in general), each configured capture images of subjects. In some implementations, the system 300 includes one or more additional image acquisition devices (e.g., the image acquisition device 305c). In some implementations, an image acquisition device 305 is substantially similar to one of the image acquisition devices 105 described with reference to FIG. 1. For example, the image acquisition device 305a can be a camera configured to capture images illuminated by IR or near-IR wavelengths, and the image acquisition device 305b can be a camera that includes a linear polarizer lens. In some implementations, where the system 300 includes at least a third image acquisition device 305c, such a device can be a LWIR (or thermal imaging) camera.

In some implementations, an NIR image acquisition device 305a can also include a structured light source such as a light source array including multiple light sources disposed in a particular pattern. In some implementations, the structured light source associated with the image acquisition device 305a can be substantially similar to one of the illumination sources 115 described above with reference to FIG. 1. Other light sources generating structured light can also be used. In some implementations, the image acquisition device 305a includes an IR camera and one or more IR light source array configured to illuminate a subject during image capture by the IR camera. In some implementations, the image acquisition device 305 includes one or more processing devices configured to generate digital data from the captured images.

The system 300 also includes an image analysis engine 310 that can be configured to analyze images captured by the image acquisition devices 305. In some implementations, the image analysis engine 310 is configured to receive digital representations of images captured by the image acquisition devices 305 and determine whether or not the images correspond to that of a live person based on a weighted combination of determinations made for images received from the individual image acquisition devices 305. The image analysis engine 310 can be configured to assign the corresponding weights based on determination of an environmental condition. For example, if the environment in which the images are being acquired includes plenty of direct sunlight, a determination made using an image acquired by an IR or near-IR camera 305a may be less reliable than a determination made using an image acquisition device that relies on the use of a linear polarizer. In such cases, the image analysis engine 310 can be configured to assign a higher weight to the determination (e.g., in the form of a score) made using the latter image acquisition device, as compared to the determination using an IR/near-IR camera.

In some implementations, the determination based on each of the multiple image acquisition devices is in the form of a score. In some implementations, the scores may be normalized to a value between 0 and 1. These scores can then be combined in a weighted combination for making a final determination as to whether the subject in the acquired images is a live human being or an alternative spoof representation. For example, in an outdoor environment, structured light results may not always be reliable, and a low weight may be assigned to a structured light result. In one particular example, if two scores 0.8 and 0.7 are obtained in an outdoor environment from a structured light image acquisition device and a linear polarizer device, respectively, the score corresponding to the structured light device can be assigned a lower weight than the score corresponding to the linear polarizer device. The final weighted score can be calculated, for example, as a weighted combination of the two scores. The weights can be assigned in various ways, for example, using the sum rule, the maximum rule, the minimum rule, the product rule etc. The particular rule to use for a given environment can be determined, for example, empirically. The final weighted score can then be compared to a threshold value to determine whether the subject of the underlying images is a live person or a spoof alternative representation.

In some implementations, the image analysis engine 310 can be configured to determine an environmental condition based on communicating with one or more environmental sensors 320. The environmental sensor can be of various types. In some implementations, the environmental sensor 320 includes a photosensor configured to sense an intensity of light in the environment. The sensor 320 can also include one or more of a temperature sensor, a GPS location sensor, a humidity sensor, etc. In some implementations, the image analysis engine can be configured to use the information received from the one or more sensors 320 in conjunction with information from one or more other sourced in determining the environmental condition. For example, if a light sensor included in the one or more sensors 320 indicate that the light level is low, the information can be used in conjunction with the time information received from a clock to determine if the low light condition is because of a cloudy condition or because it is night time. In some implementations, the image analysis engine can be configured to communicate with one or more web-based sources to obtain various types of information (e.g., weather conditions) in determining the environmental condition used in assigning the weights to the determinations made using the different image acquisition devices 305.

In some implementations, the image analysis engine 310 includes an analog to digital converter (ADC) to generate digital image data from information (e.g., sensor output) received from the image acquisition device 305. The image analysis engine includes one or more processing devices configured to execute various image analysis processes, including the processes described herein.

In some implementations, the image analysis engine 310 may reside on a computing device (e.g., a server) that is at a remote location with respect to the image acquisition device and/or the authentication engine 315. For example, the image acquisition device 305 can be disposed at a kiosk 100 that communicates over a network with a remote server on which the image analysis engine 310 executes. The image analysis engine 310 can in turn provide an output of the analysis to the authentication engine 315 residing on the kiosk 100. In some implementations, the authentication engine 315 can also reside on a remote server (e.g., the same server one which the image analysis engine 310 resides, or on a different server) and communicate the result of an authentication process to the kiosk 100.

The image analysis engine 310 can be configured to analyze the captured images in various ways, in order to determine whether or not the captured images correspond to a live person. In some implementations, the image analysis engine 310 can be configured to compute a frequency domain representation (e.g., a two dimensional Fast Fourier Transform (2D FFT), a discrete cosine transform (DCT), a wavelet transform etc.) of an image to determine whether the image includes a representation of the pattern associated with the corresponding structured light source. For example, the image analysis engine 310 can be configured to determine what percentage of the energy content of the image is in a high frequency region, and determine based on that percentage, whether or not the image includes a representation of the pattern. Referring back to FIG. 2B, an image of a spoof alternative representation is likely to include dots that are representative of the pattern of the corresponding light source array, and this in turn results in a high percentage of high frequency components in the frequency domain representation of the image. On the other hand, as illustrated by FIG. 2A, the pattern of the structured light source is far less represented in an image of a live person, and the corresponding frequency domain representation of such an image is likely to have a relatively low percentage of high frequency components. The threshold percentage used to determine whether or not an image is that of a live person can depend on various factors, including for example, presence of high frequency components in the image that are not attributable to the structured light source.

Figure 3B:
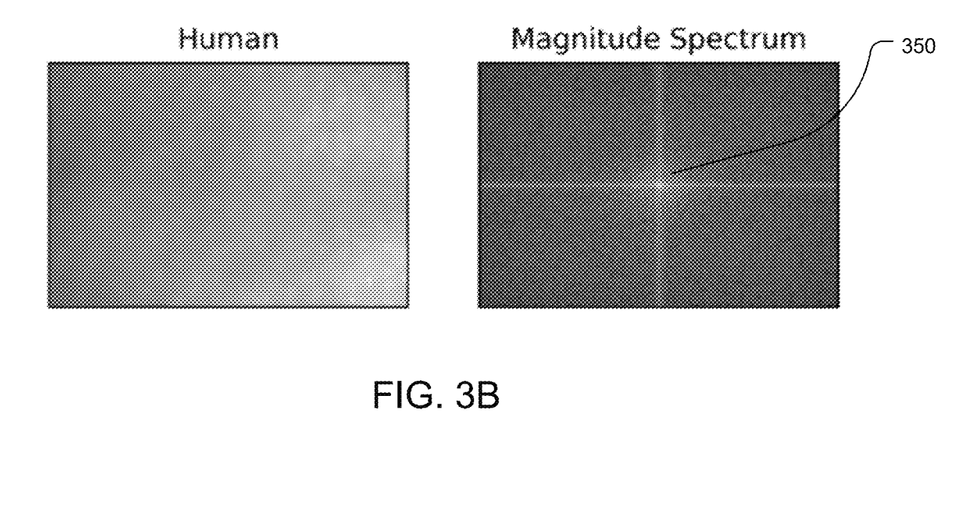
FIGS. 3B and 3C show examples of images and corresponding frequency domain representations obtained using one of the image acquisition devices of FIG. 3A.
Figure 3C:
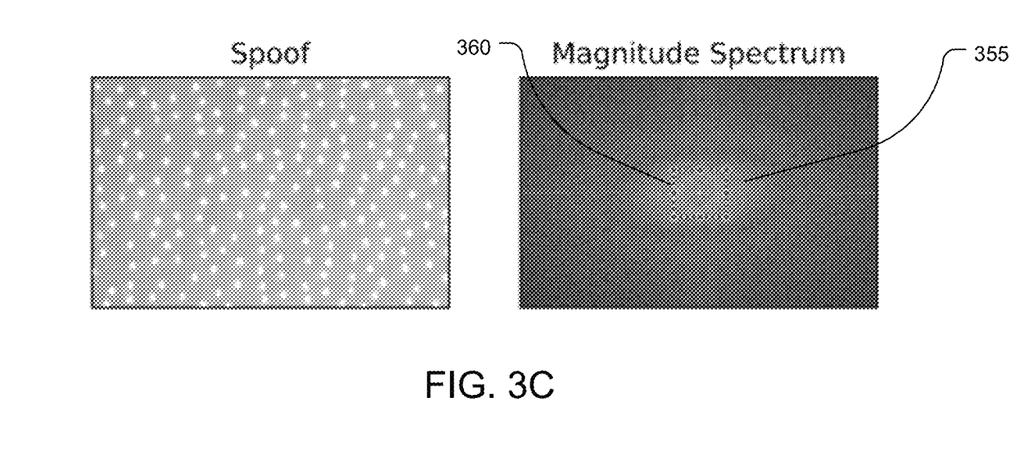

In some cases, the threshold percentage can be empirically determined based on comparing frequency contents of images of live persons and images of spoof alternative representations of live persons. In some implementations, the threshold is selected as 60%, such that an image is flagged as spoof if more than 60% energy of the image is in the high frequency spectrum. This is illustrated with the examples shown in FIGS. 3A and 3B. Specifically, FIG. 3A shows the image of structured light as captured from a human subject, and the magnitude spectrum of a corresponding frequency domain representation. FIG. 3B shows the image of a spoof alternative representation under structured light illumination, and the magnitude spectrum of the corresponding frequency domain representation. As seen from FIG. 3B, the clustering of low-grayscale values in the region 350 near the center of the frequency domain representation indicates that the energy of the image is mostly in the low frequency regions of the frequency domain representation. On the other hand, as seen from FIG. 3C, the energy of the image is spread out into the region 355 that includes higher frequencies. Such differences in the distribution of the image energy can be used to determine whether an image is that of a live person or not. For example, a low frequency region 360 can be defined, for example, to cover 20% range of each axis in the low frequency region. The energy inside and outside of such a low frequency region can then be calculated and compared to determine whether a threshold amount of energy is in the high-frequency regions of the frequency domain representation. For example, for a 60% threshold, an image can be determined to be that of a spoof alternative representation if 60% of the total image energy lies outside the region 360. The extent, shape, or other parameters of the region 360 can be experimentally determined, for example, based on nature of the images.

In some implementations, the image analysis engine 310 can be configured to execute a machine learning process to discriminate between images of a live person and images of alternative representations of live persons. In such cases, the image analysis engine can access a trained model 312, which has been trained using a learning corpus that includes both types of images. In some implementations, using a machine learning process may improve the performance of the image analysis engine 310 by reducing the false positive rate and/or the false negative rate. In some implementations, the trained model 312 can be trained to account for spoofs presented on various types of papers and display devices.

Figure 4:
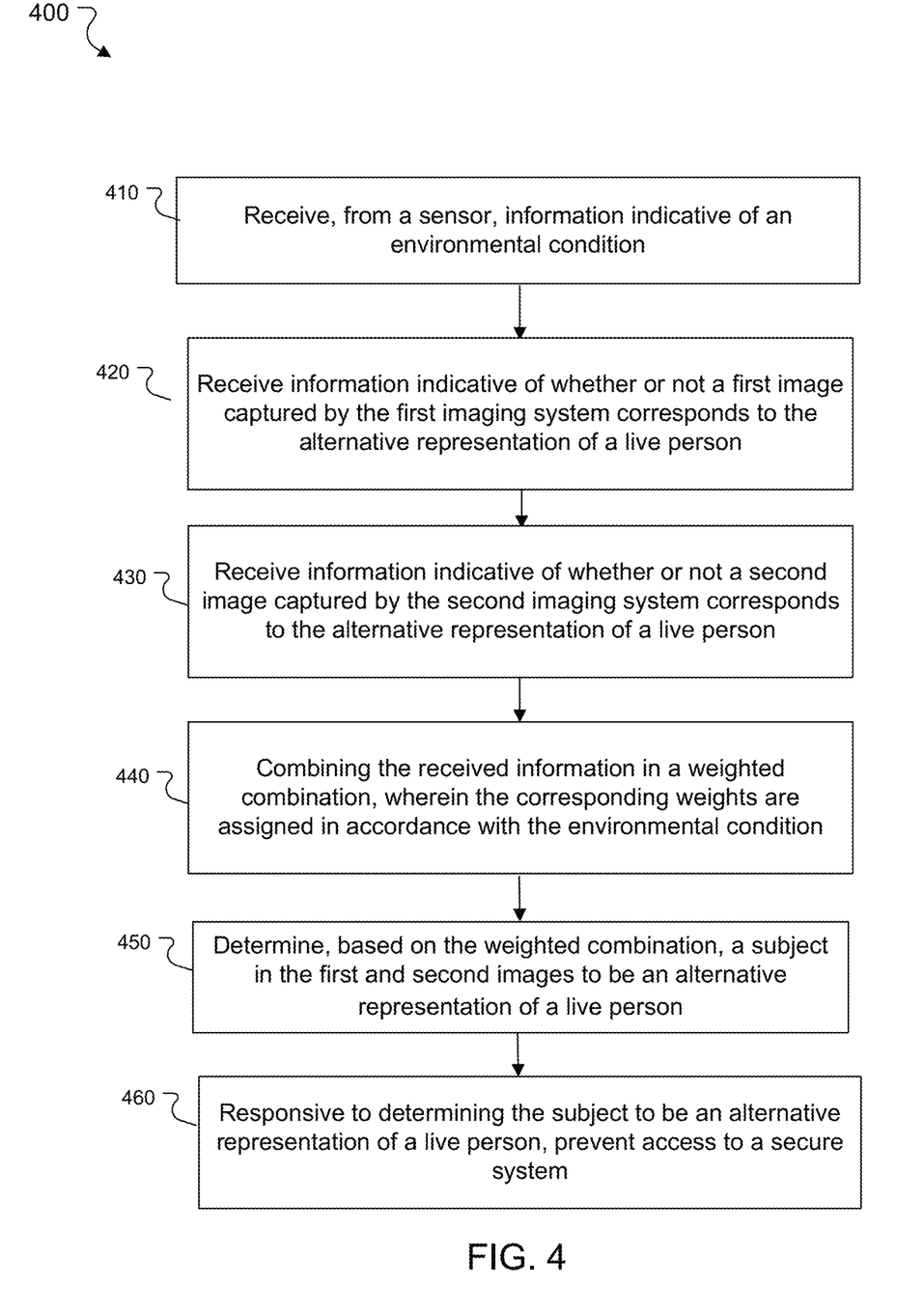
FIG. 4 is a flowchart of an example process for preventing access to a secure system based on determining a captured image to be of an alternative representation of a live person.

FIG. 4 is a flowchart of an example process 400 for preventing access to a secure system based on determining a captured image to be of an alternative representation of a live person. In some implementations, at least a portion of the process 400 may be executed by one or more processing devices disposed within a kiosk such as the kiosk 100 described with reference to FIG. 1. In some implementations, at least a portion of the process 400 may be executed by the image analysis engine 310, which may be disposed within a kiosk, a mobile device, or at one or more servers (such as servers or computing devices in a distributed computing system) in communication with remote components such as one or more processing devices disposed within a kiosk.

Operations of the process 400 includes receiving from a sensor, information indicative of an environmental condition (410). In some implementation, the information indicative of the environmental condition can indicate an amount of sunlight at a corresponding location. In some implementations, the information indicative of the environmental condition can indicate whether it is daytime or night. In some implementations, the information indicative of the environmental condition can indicate whether the environment is an indoor environment or an outdoor environment.

Operations of the process 400 also includes receiving information indicative of whether or not a first image captured by a first image acquisition device corresponds to the alternative representation of a live person (420), and receiving information indicative of whether or not a second image captured by a second image acquisition device corresponds to the alternative representation of a live person (430). In some implementations, the first image and/or the second image can be captured using an image acquisition device substantially similar to one of the image acquisition devices 305 described above with reference to FIG. 3. For example, the first image acquisition device can include an infrared (IR) camera, and the first image can be captured by the IR camera under structured light illumination. The second image acquisition device can include, for example, a polarization detector configured to detect a polarization state of light received from the subject. In some implementations, the image acquisition devices can be disposed as a part of a kiosk 100 as described above with reference to FIG. 1. In some implementations, the image acquisition devices can be disposed in a smartphone.

Operations of the process 400 further includes combining the information received from the first image acquisition device and the information received from the second image acquisition device in a weighted combination (440). The corresponding weights are assigned in accordance with the environmental condition. The weights can be assigned, for example, substantially as described above with reference to the operations of the image analysis engine 310 in FIG. 3. In some implementations, the process 400 can further include receiving information indicative of whether or not a third image captured by a third image acquisition device corresponds to the alternative representation of a live person, and including the information received from the third image acquisition device in the weighted combination. The weight associated with the information corresponding to the third image acquisition device can be determined in accordance with the environmental condition. The third image acquisition device can include, for example, a LWIR (thermal) camera.

Operations of the process 400 further includes determining, based on the weighted combination, that the subject in the image is an alternative representation of a live person (450). The alternative representation of a live person can include a photograph of the live person. The photograph can be printed on paper, or displayed on a display device such as the screen of a mobile device.

Operations of the process 400 also includes preventing, responsive to identifying the subject in the image to be an alternative representation of a live person, access to the secure system (460). In some implementations, where a user-interface of the secure system is disposed as a part of a kiosk, identifying a captured image to be a spoof can prevent an access attempt made through the kiosk. On the other hand, if a determination is made that the image does not include features representative of the predetermined pattern, the subject in the image can be identified as a live person, and an authentication process for determining if the live person is authorized to access the secure system is initiated. This can be done, for example, using an authentication system substantially similar to the authentication engine 315 described above with reference to FIG. 3. If such an authentication engine authenticates the live person to access the secure system (e.g., a user account or privileges associated with the access attempt), the live person is allowed to continue the interaction with the corresponding user interface (e.g., a kiosk or a smartphone).

Figure 5:
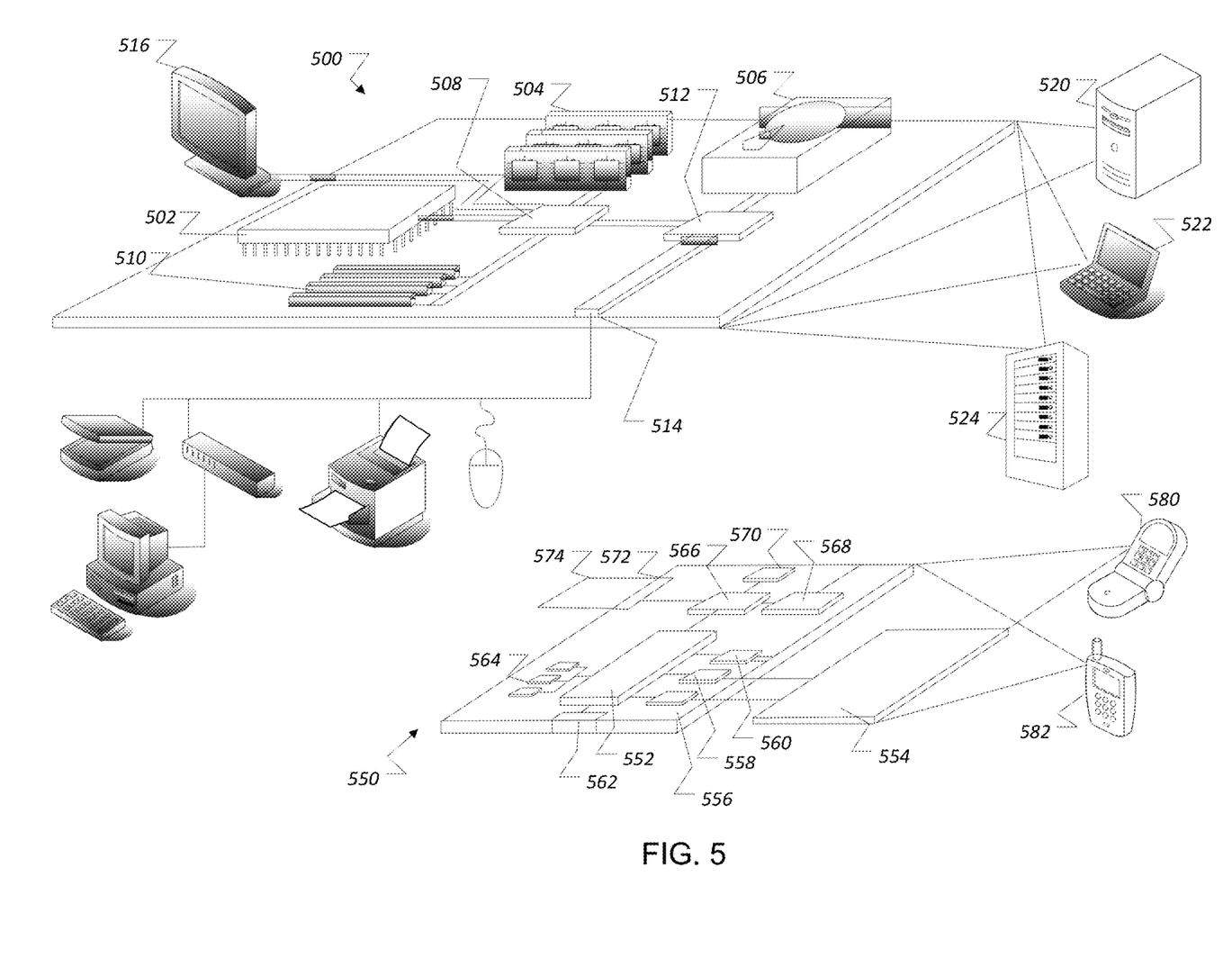
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for preventing access to a secure system based on determining one or more captured images to be of an alternative representation of a live person, the method comprising:
    receiving from a sensor, information indicative of an environmental condition;
    receiving, at one or more processing devices, first information indicative of whether or not a first image captured by a first image acquisition device corresponds to the alternative representation of a live person;
    receiving, at the one or more processing devices, second information indicative of whether or not a second image captured by a second image acquisition device corresponds to the alternative representation of a live person;
    combining the first information and the second information in a weighted combination, wherein the corresponding weights are assigned in accordance with the environmental condition;
    determining, based on the weighted combination, that a subject in the first and second images is an alternative representation of a live person; and
    responsive to determining the subject is an alternative representation of a live person, preventing access to the secure system.

2. The method of claim 1, wherein the alternative representation of a live person comprises a photograph of the live person.

3. The method of claim 2, wherein the photograph is printed on paper, or presented on a display device.

4. The method of claim 1, wherein the first image acquisition device comprises an infrared (IR) camera, and the first image is captured by the IR camera under structured light illumination.

5. The method of claim 1, wherein the second image acquisition device comprises a polarization detector configured to detect a polarization state of light received from the subject.

6. The method of claim 1, further comprising:
    receiving, at the one or more processing devices, third information indicative of whether or not a third image captured by a third image acquisition device corresponds to the alternative representation of a live person; and
    including the third information in the weighted combination, wherein the weight associated with the third information is determined in accordance with the environmental condition.

7. The method of claim 6, wherein the third image acquisition device comprises a thermal camera.

8. The method of claim 1, wherein the environmental condition indicates that a corresponding location is one of an indoor location or an outdoor location.

9. The method of claim 1, wherein the information indicative of the environmental condition indicates an amount of sunlight at a corresponding location.

10. The method of claim 1, wherein the secure system comprises a user-interface disposed in a kiosk.

11. A system comprising:
    an image analysis engine comprising one or more processing devices, the image analysis engine configured to:
        receive from a sensor, information indicative of an environmental condition;
        receive first information indicative of whether or not a first image captured by a first image acquisition device corresponds to the alternative representation of a live person;
        receive second information indicative of whether or not a second image captured by a second image acquisition device corresponds to the alternative representation of a live person;
        combine the first information and the second information in a weighted combination, wherein the corresponding weights are assigned in accordance with the environmental condition;
        determine, based on the weighted combination, that a subject in the first and second images is an alternative representation of a live person; and
        responsive to determining that the subject is an alternative representation of a live person, prevent access to the secure system.

12. The system of claim 11, wherein the alternative representation of a live person comprises a photograph of the live person.

13. The system of claim 12, wherein the photograph is printed on paper, or presented on a display device.

14. The system of claim 11, wherein the first image acquisition device comprises an infrared (IR) camera, and the first image is captured by the IR camera under structured light illumination.

15. The system of claim 11, wherein the second image acquisition device comprises a polarization detector configured to detect a polarization state of light received from the subject.

16. The system of claim 11, wherein the image analysis engine is configured:
    receive third information indicative of whether or not a third image captured by a third image acquisition device corresponds to the alternative representation of a live person; and
    including the third information in the weighted combination, wherein the weight associated with the third information is determined in accordance with the environmental condition.

17. The system of claim 11, wherein the environmental condition indicates that a corresponding location is one of an indoor location or an outdoor location.

18. The system of claim 11, wherein the secure system comprises a user-interface disposed in a kiosk.

19. The system of claim 18, wherein the sensor is disposed in the kiosk.

20. One or more non-transitory machine-readable storage devices comprising machine-readable instructions configured to cause one or more processing devices perform operations comprising:
- receiving from a sensor, information indicative of an environmental condition;
- receiving first information indicative of whether or not a first image captured by a first image acquisition device corresponds to the alternative representation of a live person;
- receiving second information indicative of whether or not a second image captured by a second image acquisition device corresponds to the alternative representation of a live person;
- combining the first information and the second information in a weighted combination, wherein the corresponding weights are assigned in accordance with the environmental condition;
- determining, based on the weighted combination, that a subject in the first and second images is an alternative representation of a live person; and
- responsive to determining the subject is an alternative representation of a live person, preventing access to the secure system.

* * * * *